United States Patent
Zhang et al.

(10) Patent No.: US 10,613,689 B2
(45) Date of Patent: Apr. 7, 2020

(54) TOUCH SCREEN, METHOD OF MANUFACTURING TOUCH SCREEN, AND DISPLAY DEVICE INCLUDING TOUCH SCREEN

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Lei Zhang, Beijing (CN); Taofeng Xie, Beijing (CN); Lingyan Wu, Beijing (CN); Yang Liu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 133 days.

(21) Appl. No.: 15/574,584

(22) PCT Filed: Mar. 15, 2017

(86) PCT No.: PCT/CN2017/076805
§ 371 (c)(1),
(2) Date: Nov. 16, 2017

(87) PCT Pub. No.: WO2018/045738
PCT Pub. Date: Mar. 15, 2018

(65) Prior Publication Data
US 2019/0212840 A1 Jul. 11, 2019

(30) Foreign Application Priority Data
Sep. 12, 2016 (CN) .......................... 2016 1 0818426

(51) Int. Cl.
*G06F 3/044* (2006.01)
*G06F 3/041* (2006.01)
(Continued)

(52) U.S. Cl.
CPC .............. *G06F 3/044* (2013.01); *G06F 3/041* (2013.01); *G06F 3/0412* (2013.01);
(Continued)

(58) Field of Classification Search
USPC .................................................. 345/173–174
See application file for complete search history.

(56) References Cited

U.S. PATENT DOCUMENTS

| 2011/0063237 A1* | 3/2011 | Hung ...................... G06F 3/044 |
| | | 345/173 |
| 2014/0160377 A1* | 6/2014 | Yamagishi .............. G06F 3/044 |
| | | 349/12 |

(Continued)

FOREIGN PATENT DOCUMENTS

| CN | 104079718 A | 10/2014 |
| CN | 104932748 A | 9/2015 |

(Continued)

OTHER PUBLICATIONS

International Search Report dated Oct. 20, 2015, issued in counterpart International Application No. PCT/JP2015/072346, with English translation (3 pages).
(Continued)

*Primary Examiner* — Kwin Xie
(74) *Attorney, Agent, or Firm* — Westerman, Hattori, Daniels & Adrian, LLP (57) ABSTRACT

The present disclosure relates generally to a method for manufacturing a touch screen, a touch screen, and a display device having a touch screen. An embodiment of the method for manufacturing a touch screen may include forming a
(Continued)

touch sensor and a fingerprint sensor concurrently on a glass substrate; thinning the glass substrate at a portion facing the fingerprint sensor to a predetermined thickness.

12 Claims, 8 Drawing Sheets

(51) Int. Cl.
  *G06F 9/00* (2006.01)
  *G06K 9/00* (2006.01)
(52) U.S. Cl.
  CPC ....... *G06K 9/0002* (2013.01); *G06K 9/00053* (2013.01); *G06F 2203/04103* (2013.01); *G06F 2203/04111* (2013.01); *G06F 2203/04112* (2013.01)

(56) References Cited

U.S. PATENT DOCUMENTS

| | | | |
|---|---|---|---|
| 2016/0340773 A1* | 11/2016 | Ochi | C22C 21/00 |
| 2017/0168336 A1* | 6/2017 | Hwang | G02F 1/136209 |
| 2017/0220161 A1* | 8/2017 | Lee | G06F 3/044 |
| 2017/0286739 A1* | 10/2017 | Shibano | G06K 9/0002 |
| 2017/0371461 A1* | 12/2017 | Lee | G06K 9/00 |
| 2018/0052359 A1* | 2/2018 | Umemoto | G02F 1/1333 |

FOREIGN PATENT DOCUMENTS

| | | |
|---|---|---|
| CN | 104932763 A | 9/2015 |
| CN | 105138958 A | 12/2015 |
| JP | 2003-198944 A | 7/2003 |
| JP | 2003-348464 A | 12/2003 |
| WO | 2014/175005 A1 | 10/2014 |
| WO | 2016122173 A1 | 8/2016 |

OTHER PUBLICATIONS

Office Action dated Jul. 30, 2018, issued in counterpart Chinese application No. 201610818426.7, with English translation. (13 pages).

* cited by examiner

TOUCH SCREEN, METHOD OF MANUFACTURING TOUCH SCREEN, AND DISPLAY DEVICE INCLUDING TOUCH SCREEN

CROSS-REFERENCE TO RELATED APPLICATIONS

This application claims the benefit of the filing date of Chinese Patent Application No. 201610818426.7 filed on Sep. 12, 2016, the entire disclosure of which is hereby incorporated by reference.

TECHNICAL FIELD

The present disclosure relates generally to touch sensing and fingerprint recognition technologies, and in particular, to a method of manufacturing a touch screen, a touch screen, and a display device having a touch screen.

BACKGROUND

There has been growing demand in recent years for fingerprint sensors that can capture fingerprints at a high resolution of 0.1 mm or more. The size of pattern and pitch that can be designed for the fingerprint sensing element is correspondingly reduced, which in turn requires narrower line widths and line spacings, and increases the need for pinpoint accuracy during exposure. In addition, the reduction in the size of the pattern pitch reduces the sensitivity of the fingerprint sensor.

Existing technologies for manufacturing touch screens cannot form a touch sensor and a fingerprint sensor concurrently, for example, in parallel and simultaneously, on a glass substrate. Instead, in order for a touch screen to perform functions relating to fingerprint recognition, existing technologies require forming an opening in the glass substrate in order to embed the fingerprint sensor in the glass substrate. This complicates the manufacturing process, and significantly raises the associated manufacturing costs.

BRIEF SUMMARY

One embodiment of the present disclosure is a method of manufacturing a touch screen. The method may comprise: forming a patterned electrode layer on a glass substrate; forming an insulating layer on the patterned electrode layer; and forming a patterned metal layer covering the insulating layer and the patterned electrode layer. The patterned electrode layer, the insulating layer and the patterned metal layer form a touch sensor and a fingerprint sensor. The touch screen according to an embodiment of the present disclosure may comprise a display portion and a fingerprint recognition portion, The patterned electrode layer may comprise a plurality of first electrodes forming the touch sensor on a portion of the glass substrate in the display portion. The patterned electrode layer may also comprise a plurality of second electrodes forming a first component of the fingerprint sensor on a portion of the glass substrate in the fingerprint recognition portion.

The patterned metal layer may comprise a plurality of metal bridges for connecting the first electrodes. The patterned metal layer may also comprise a plurality of metal electrodes forming a second component of the fingerprint sensor.

In at least some embodiments of the present disclosure, the plurality of first electrodes may comprise a plurality of touch sensing electrodes arranged in a first direction, and a plurality of touch control electrodes arranged in a second direction. The plurality of touch sensing electrodes may intersect the plurality of touch control electrodes. One of the plurality of touch sensing electrodes and the plurality of touch control electrodes may be discontinuous at positions of intersection.

The plurality of second electrodes may comprise a plurality of fingerprint sensing electrodes. The plurality of metal electrodes may comprise a plurality of fingerprint recognition control electrodes.

Each of the plurality of metal bridges may be formed on the first electrodes, so as to connect two ends of discontinuous one of touch sensing electrode and touch sensing electrode at a position of intersection.

The plurality of first electrodes and the plurality of second electrodes may be composed of a transparent conductive material.

Before the forming of the patterned electrode layer, a black matrix pattern may be formed on the glass substrate. The black matrix pattern may comprise a first black matrix, a second black matrix, and a third black matrix arranged consecutively, so that an area of the glass substrate between the first black matrix and the second black matrix may define the display portion, and an area of the glass substrate between the second black matrix and the third black matrix may define the fingerprint recognition portion.

The patterned metal layer may further comprise a metal trace formed along at least a portion of a periphery of each of the display portion and the fingerprint recognition portion.

A cover layer may be formed. In at least some embodiments of the present disclosure, the cover layer does not cover at least a portion of the metal trace, so as to form a bonding area opening for electrically connecting the portion of the metal trace to an external circuit.

In at least some embodiments of the present disclosure, before forming a patterned electrode layer on a glass substrate, a conductive bridge layer may be formed on the glass substrate. The conductive bridge layer may comprise a first array of first conductive bridges arranged on a portion of the glass substrate in the display portion. The conductive bridge layer may also comprise a second array of second conductive bridges on a portion of the glass substrate in the fingerprint recognition portion.

An insulation layer may be formed on the conductive bridge layer.

The patterned electrode layer may comprise a plurality of first electrodes forming a touch sensor in the display portion. The patterned electrode layer may also comprise a plurality of second electrodes forming a fingerprint sensor in the fingerprint recognition portion.

The patterned metal layer may comprise a metal electrode layer formed on the plurality of second electrodes.

The first electrodes may comprise a plurality of touch sensing electrodes arranged in a first direction. The first electrodes may also comprise a plurality of touch control electrodes arranged in a second direction. The plurality of touch sensing electrodes may intersect the plurality of touch control electrodes. One of the plurality of touch sensing electrodes and the plurality of touch control electrodes may be discontinuous at positions of intersection. Each of the first conductive bridges may connect two ends of discontinuous one of touch sensing electrode and touch control electrode at a position of intersection.

The plurality of second electrodes may comprise a plurality of fingerprint sensing electrodes arranged in a first direction. The second electrodes may also comprise a plurality of fingerprint recognition control electrodes arranged in a second direction. The plurality of fingerprint sensing electrodes may intersect the plurality of fingerprint recognition control electrodes. One of the plurality of fingerprint sensing electrodes and the plurality of fingerprint recognition control electrodes may be discontinuous at positions of intersection. Each of the second conductive bridges may connect two ends of discontinuous one of touch sensing electrode and touch control electrode at a position of intersection.

The patterned metal layer may further comprise a metal trace formed along a periphery of each of the display portion and the fingerprint recognition portion of the glass substrate.

Before the forming of the conductive bridge layer, a black matrix pattern may be formed on the glass substrate, the black matrix pattern comprising a first black matrix, a second black matrix, and a third black matrix arranged consecutively, so that an area of the glass substrate between the first black matrix and the second black matrix may define the display portion of the glass substrate, and an area of the glass substrate between the second black matrix and the third black matrix may define the fingerprint recognition portion of the glass substrate.

A cover layer may be formed. In at least some embodiments of the present disclosure, the cover layer does not cover at least a portion of the metal trace, so as to form a bonding area opening for electrically connecting the portion of the metal trace to an external circuit.

A portion of the glass substrate facing the fingerprint sensor may be thinned to a thickness of less than or equal to 0.1 mm.

The thinning of the glass substrate may comprise: providing a protective layer on the fingerprint sensor; reducing the thickness of the portion of the glass substrate facing the fingerprint sensor to less than or equal to 0.1 mm; and removing the protective layer.

Another embodiment of the present disclosure is a touch screen. The touch screen may comprise: a glass substrate, a touch sensor disposed on a first portion of the glass substrate, and a fingerprint sensor disposed on a second protion of the glass substrate.

A thickness of the second portion of the glass substrate facing the fingerprint sensor may be smaller than a thickness of the first portion of the glass substrate facing the touch sensor.

Another embodiment of the present disclosure is a display device. The display device may comprise a touch screen manufacture according to the present disclosure.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Next, the embodiments of the present disclosure will be described clearly and completely in conjunction with the accompanying drawings, which are described briefly above. The subject matter of the present disclosure is described with specificity to meet statutory requirements. However, the description itself is not intended to limit the scope of this disclosure. Rather, the inventors have contemplated that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiment for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

Figure 1:
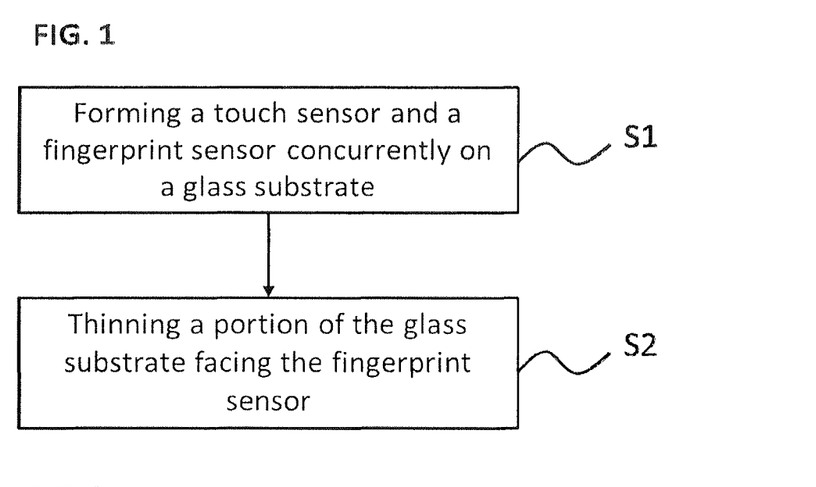
FIG. 1 is a flowchart of a method of manufacturing a touch screen according to an embodiment of the present disclosure.

As shown in FIG. 1, a method of manufacturing a touch screen according to an embodiment of the present disclosure includes:

A step S1 of fabricating a sensor: The touch sensor and the fingerprint sensor are formed concurrently, for example, in parallel and/or simultaneously, on the glass substrate.

A step S2 of thinning a fingerprint recognition portion: A portion of the glass substrate facing the fingerprint sensor is thinned.

By reducing the thickness of the glass substrate, and thus amplifying the amount of change in capacitance in the fingerprint recognition module, the method for manufacturing a touch screen according to the present disclosure makes it possible to integrate a fingerprint recognition module into a touch screen. Forming the touch sensor and the fingerprint sensor concurrently also avoids the conventional requirement of cutting an opening in the glass substrate in order to embed the fingerprint recognition module. The present disclosure simplifies the process of manufacturing a touch screen with integrated fingerprint recognition technology, and reduces the manufacturing costs.

Improvements in the exposure accuracy of the OGS (One Glass Solution) TP (Touch Panel) production line generally mean that the high resolution of 0.1 mm can be obtained without problem. Embodiments of the present disclosure, in which the touch sensor and the fingerprint sensor are formed concurrently, followed by the thinning of the glass substrate in the fingerprint recognition portion to a thickness of 0.1 mm or less, enable the integration of fingerprint recognition technology into OGS TP, without the attendant complexities and costliness of conventional manufacturing techniques.

Preferably, the glass substrate is thinned to a thickness of less than or equal to 0.1 mm. However, the thickness is not particularly limited, and may be any suitable thickness that does not interfere with fingerprint recognition functions.

The glass substrate may be thinned by physical or chemical means. Processes such as physical grinding, chemical etching, and other methods may be used. Further, a single-sided thinning process or a double-sided thinning process (thinning two OGS substrates that have been adhered to each other) may be used.

The step of thinning the fingerprint recognition portion may include:
 providing a protective layer on the fingerprint sensor;
 reducing a thickness of the portion of the glass substrate facing the fingerprint sensor by physical or chemical means;
 removing the protective layer.

As described in detail below by way of specific embodiments, a 5-mask process or a 6-mask process may be used to manufacture a touch screen according to the present disclosure.

First Embodiment

Figure 2:
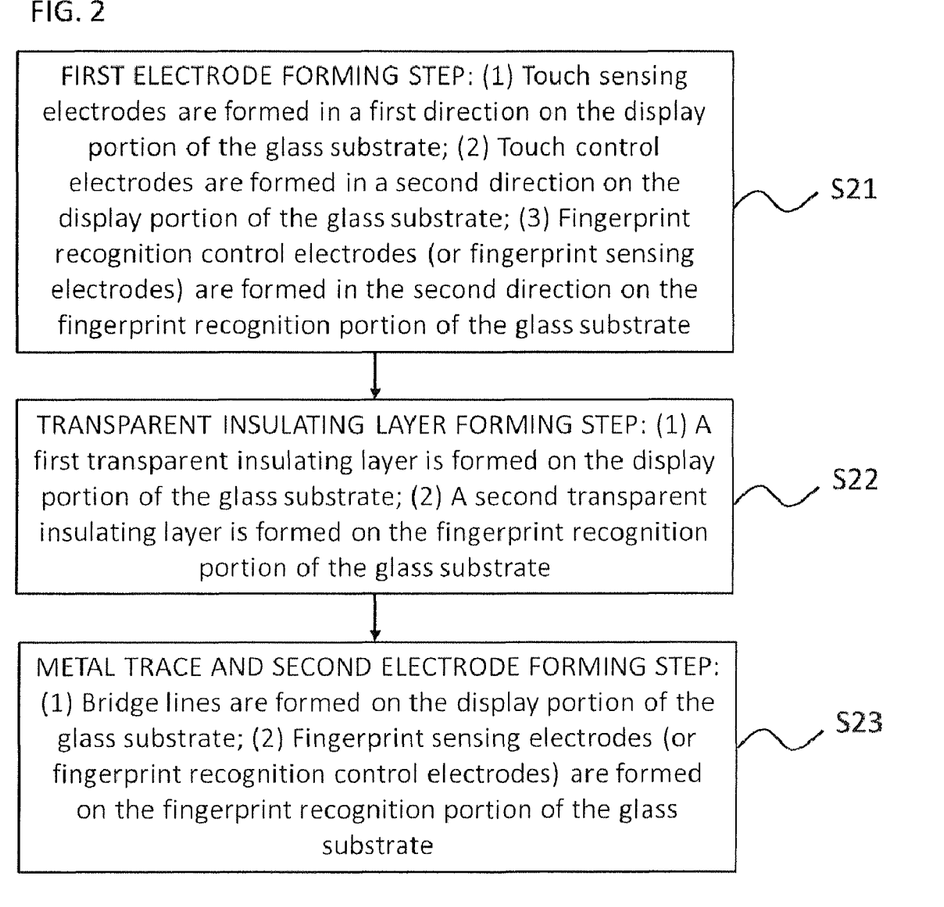
FIG. 2 is a flowchart of a method of manufacturing a sensor for a touch screen according to a first embodiment of the present disclosure.

According to a first embodiment, as shown in FIG. 2, the sensor fabrication step S1 may include the following steps.

First electrode forming step S21: In a first patterning process, a patterned electrode layer is formed on a glass substrate. More particularly, plurality of touch sensing electrodes are arranged in a first direction and a plurality of touch control electrodes are arranged in a second direction on a display portion of the glass substrate. A plurality of fingerprint recognition control electrodes arranged in the second direction on a fingerprint recognition portion of the glass substrate. There are no particular imitations on whether the fingerprint recognition control electrodes or the fingerprint sensing electrodes are formed in this step. Either the fingerprint recognition control electrodes or the fingerprint sensing electrodes may be formed in this step. The fingerprint sensing electrodes will be described in more details below.

The touch control electrodes intersect the touch sensing electrodes. At a position of intersection, the touch control electrodes may be discontinuous, for example, so that a touch sensing electrode may be extended through the opening between two ends of a discontinuous touch control electrode at the position of discontinuity. However, there are no particular limitations on whether the touch control electrodes or the touch sensing electrodes are patterned to be discontinuous at the positions of intersection. Either the touch control electrodes or the touch sensing electrodes may be made discontinuous, so as to allow the other electrodes to extend through the openings at the positions of discontinuity. The electrodes formed in the first patterning process may be made of a transparent conductive material. Preferably, the electrodes formed in the first patterning process are composed of the same material.

Transparent insulating layer forming step S22: In a second patterning process, insulating layers are formed on the patterned electrode layer. A first transparent insulating layer is formed, which insulates the touch control electrodes from the touch sensing electrodes. A second transparent insulating layer covers the fingerprint recognition portion of the glass substrate. More particularly, the second transparent insulating layer covers the electrodes formed on the fingerprint recognition portion of the glass substrate during step S21. The first transparent insulating layer and the second transparent insulating layer may be a same layer and formed in the second patterning process.

Metal trace and second electrode forming step S23: In a third patterning process, a patterned metal layer is formed. A bridge line is formed on the display portion of the glass substrate, and a plurality of fingerprint sensing electrodes (or fingerprint recognition control electrodes, if the fingerprint sensing electrodes are previously formed in the first patterning process in step S21) are arranged in the first direction on the fingerprint recognition portion of the glass substrate. At a position of intersection between the touch control electrodes and the touch sensing electrodes, the bridge line connects the two ends of a discontinuous electrode at the position of discontinuity. The bridge line and the electrodes formed in the third patterning process may be made of a conductive metal. Preferably, the bridge line and the electrodes formed in the third patterning process are composed of the same material, In particular, in the first patterning process, the touch sensing electrodes and touch control electrodes are formed on the display portion of the glass substrate, and either the fingerprint recognition control electrodes or the fingerprint sensing electrodes are formed on the fingerprint recognition portion of the glass substrate. Then, in a second patterning process, a first transparent insulating layer is formed on the display portion of the glass substrate, and a second transparent insulating layer is formed on the fingerprint recognition portion of the glass substrate. In a third patterning process, bridge lines are formed on the display portion of the glass substrate to connect two ends of the discontinuous electrodes at the positions of intersection between the touch control electrodes and the touch sensing electrodes, and the fingerprint sensing electrodes (or the fingerprint recognition control electrodes, if the fingerprint sensing electrodes are previously formed first in the first patterning process step S21) are formed on the fingerprint recognition portion of the glass substrate. The sequence of patterning processes allow the touch sensor and the fingerprint sensor to be formed concurrently, for example, in parallel and/or simultaneously, on the glass substrate, which in turn simplifies the manufacturing process and reduces the manufacturing costs.

In the present disclosure, the first direction may refer to the longitudinal direction and the second direction to the transverse direction, or vice versa. The touch sensing electrodes and the touch control electrodes are preferably made of a transparent conductive material, such as ITO (indium tin oxide), so as to not affect the display functions of the display portion. Even though the bridge lines formed in the third patterning process are made of metal, the size of the bridge lines is very small, so as to have little to no effects on the display functions of the display portion. Further, the electrodes that are formed on the fingerprint recognition portion of the glass substrate in the first patterning process, and concurrently with the touch control electrodes and the touch sensing electrodes, are also preferably made of a transparent conductive material, and more preferably, the same transparent conductive material as the touch control electrodes and the touch sensing electrodes. The electrodes that are formed on the fingerprint recognition portion of the glass substrate in the third patterning process are preferably made of the same metal material as the metal bridge lines. The fingerprint recognition portion performs the fingerprint recognition functions, so as to be less concerned with the effects of metal electrodes than electrodes performing the display functions of the touch screen.

Prior to the first electrode forming step S21, there may be a partitioning step: A black matrix is patterned sequentially in a first direction onto the glass substrate, the black matrix including at least a first black matrix, a second black matrix, and a third black matrix. An area of the glass substrate between the first black matrix and the second black matrix is the display portion. An area of the glass substrate between the second black matrix and the third black matrix is the fingerprint recognition portion The first black matrix, the second black matrix, and the third black matrix effectively function as borders for distinguishing between the display portion and the fingerprint recognition portion of the touch screen.

The metal trace and second electrode forming step S23 may further include, in the third patterning process, forming a peripheral metal trace on the black matrix. More particularly, a metal trace may be formed along a periphery of each of the display portion and the fingerprint recognition portion of the glass substrate.

After the metal trace and second electrode forming step S23, there may be a step of forming a cover layer: A cover layer is provided on each of the display portion and the fingerprint recognition portion of the glass substrate. The cover layer does not cover at least a portion of the peripheral metal trace disposed between the display portion and the fingerprint recognition portion of the glass substrate, so as to form a bonding area opening. More particularly, to form the bonding area opening, the cover layer does not cover at least a portion of the peripheral metal trace formed on the second black matrix. The cover layer may be made of a transparent insulating material.

The cover layer protects the touch sensor provided on the display portion of the glass substrate, and the fingerprint sensor provided on the fingerprint recognition portion of the glass substrate. The bonding area opening allows the metal trace in the bonding area opening to be electrically connected to an external circuit, for example, a control IC (integrated circuit), in order to receive and transmit signals.

Next, a method of manufacturing the touch panel according to the first embodiment will be described with reference to FIGS. 3A to 3F.

A first embodiment of the method for manufacturing the touch screen according to the present disclosure employs a 5-mask process.

Figure 3A:
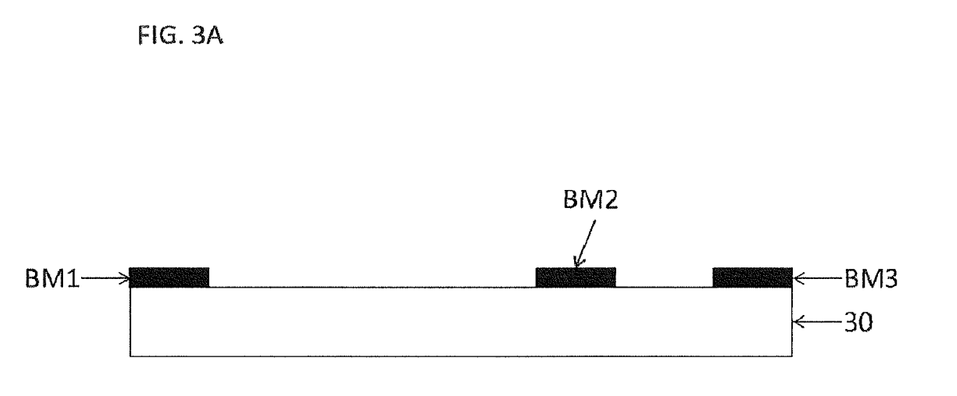
FIGS. 3A, 3B, 3D, 3E, and 3F show sectional schematic views of a touch screen formed according to a first embodiment of the present disclosure.

As shown in FIG. 3A, a black matrix layer is formed on the surface of the glass substrate 30 to partition the glass substrate into a display portion and a fingerprint recognition portion.

On the glass substrate 30, the black matrix layer includes a first black matrix BM1, a second black matrix BM2, and a third black matrix BM3.

An area of the glass substrate between the first black matrix BM1 and the second black matrix BM2 is the display portion. An area of the glass substrate between the second black matrix BM2 and the third black matrix BM3 is the fingerprint recognition portion.

Figure 3B:
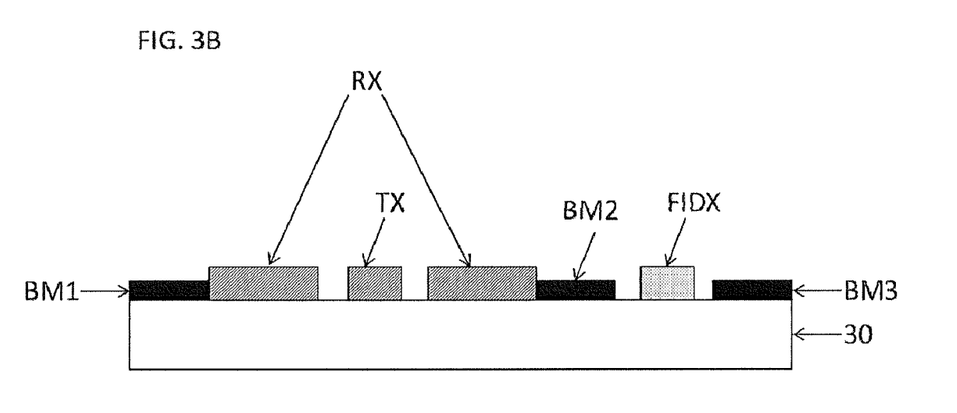

As shown in FIG. 3B, a first patterning process forms an ITO pattern on the display portion of the glass substrate, and an ITO pattern on the fingerprint recognition portion.

In the embodiment of the first patterning process illustrated in FIG. 3B, a plurality of touch sensing electrodes RX are arranged in the longitudinal direction and a plurality of touch control electrodes TX are arranged in the transverse direction on the display portion of the glass substrate 30. A plurality of fingerprint recognition control electrodes FIDX are formed, and arranged in the transverse direction. The touch sensing electrodes RX, the touch control electrodes TX, and the fingerprint recognition control electrodes FIDX are made of ITO.

However, there are no particular limitations on the relative orientation of the touch sensing electrodes RX and the touch control electrodes TX. There are also no particular limitations on the order in which the fingerprint recognition control electrodes or the fingerprint sensing electrodes are formed. That is, either the fingerprint recognition control electrodes or the fingerprint sensing electrodes may be formed in the first patterning process.

In the embodiment illustrated in FIG. 3B, the plurality of touch control electrodes TX and the plurality of touch sensing electrodes RX intersect each other. At the position of intersection, the touch sensing electrodes RX are discontinuous, for example, so that a touch control electrode TX may be extended through the opening between two ends of a discontinuous touch sensing electrode RX. However, either the touch sensing electrodes RX or the touch control electrodes TX may be patterned to be discontinuous at the positions of intersection.

Figure 3C:
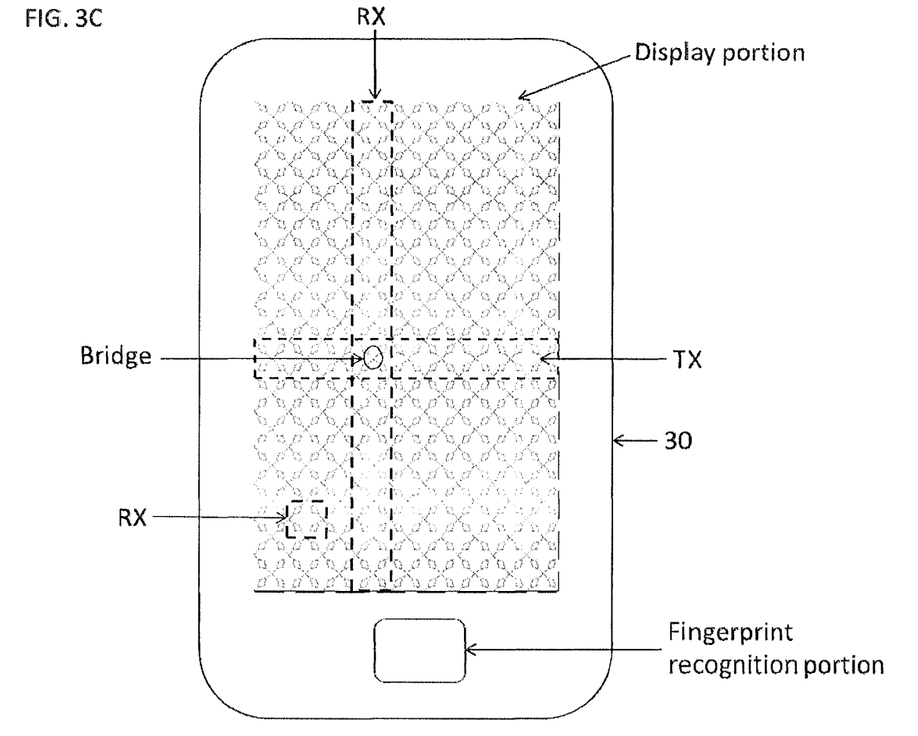
FIG. 3C is a top view of FIG. 3B.

FIG. 3C is a top view of FIG. 3B. In FIG. 3C, the electrodes provided on the fingerprint recognition portion in the first patterning process are not shown. The fingerprint recognition portion has a small area, so that the electrodes provided on this portion cannot be clearly drawn in this top view.

Figure 3D:
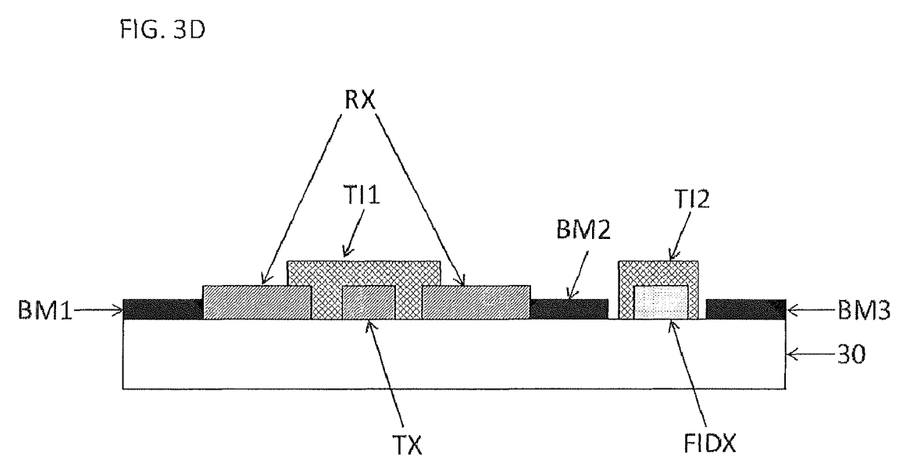

As shown in FIG. 3D, in a second patterning process, a first transparent insulating layer is formed on the display portion, and a second transparent insulating layer is formed on the fingerprint recognition portion.

The first transparent insulating layer TI1 is provided to insulate the touch control electrodes TX from the touch sensing electrodes RX, so as to partition the touch control electrodes TX and the touch sensing electrodes RX. The second transparent insulating layer TI2 covers the fingerprint recognition control electrodes FIDX (or the fingerprint sensing electrodes FIIX, if these electrodes are formed instead with the touch control electrodes TX and the touch sensing electrodes RX in the first patterning process). The transparent insulating layers may be formed directly on the electrodes.

Figure 3E:
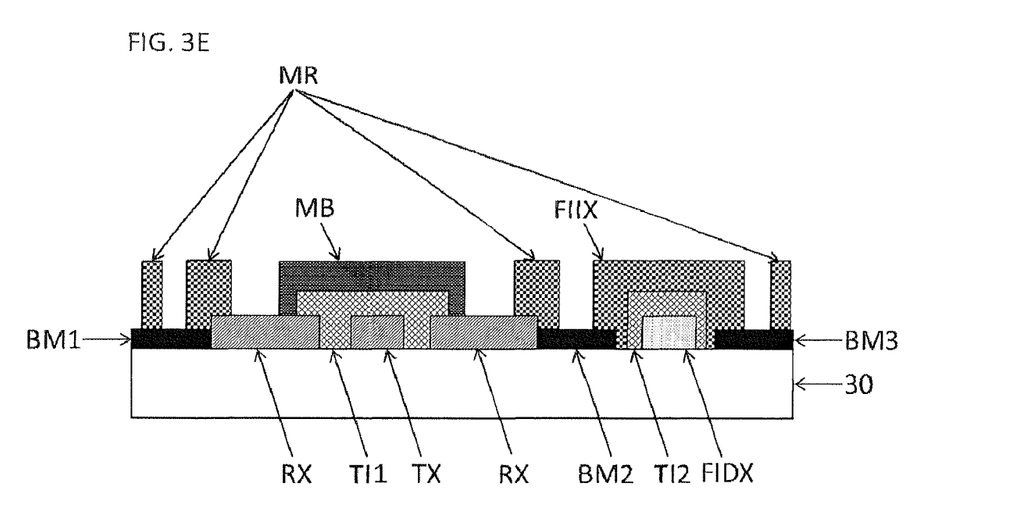

As shown in FIG. 3E, a third patterning process forms a metal trace on the display portion, a metal trace on the fingerprint recognition portion, and a metal pattern of the fingerprint recognition portion are formed.

In the embodiment of the third patterning process illustrated in FIG. 3E, a bridge line MB is formed on the display portion of the glass substrate, and a plurality of fingerprint sensing electrodes FIIX are formed, in a longitudinal direction, on the fingerprint recognition portion of the glass substrate 30. Note, however, that the third patterning process may be used to form the fingerprint recognition control electrodes FIDX instead, if the fingerprint sensing electrodes FIIX are previously formed in the first patterning step.

In the embodiment illustrated in FIG. 3E, the bridge line MB connects the two ends of a discontinuous touch sensing electrode RX at a position of intersection between the touch sensing electrodes RX and the touch control electrodes TX. However, in the embodiment where the touch control electrodes TX are discontinuous at the position of intersection, the bridge lines MB would connect the two ends of the discontinuous touch control electrodes TX at the positions of discontinuity.

The bridge line MB and the fingerprint sensing electrodes FIIX (or fingerprint recognition control electrodes FIDX, if the fingerprint sensing electrodes FIIX are previously formed in the first patterning process) are made of a conductive metal.

Also in the third patterning process, a peripheral metal trace MR is formed on the black matrix. The metal trace MR may be formed along a periphery of each of the display portion and the fingerprint recognition portion of the glass substrate. The peripheral metal trace provided on the first black matrix BM1 and the second black matrix BM2 forms the peripheral metal trace of the display portion, and the peripheral metal trace provided on the third black matrix BM3 forms the peripheral metal trace of the fingerprint recognition portion.

Figure 3F:
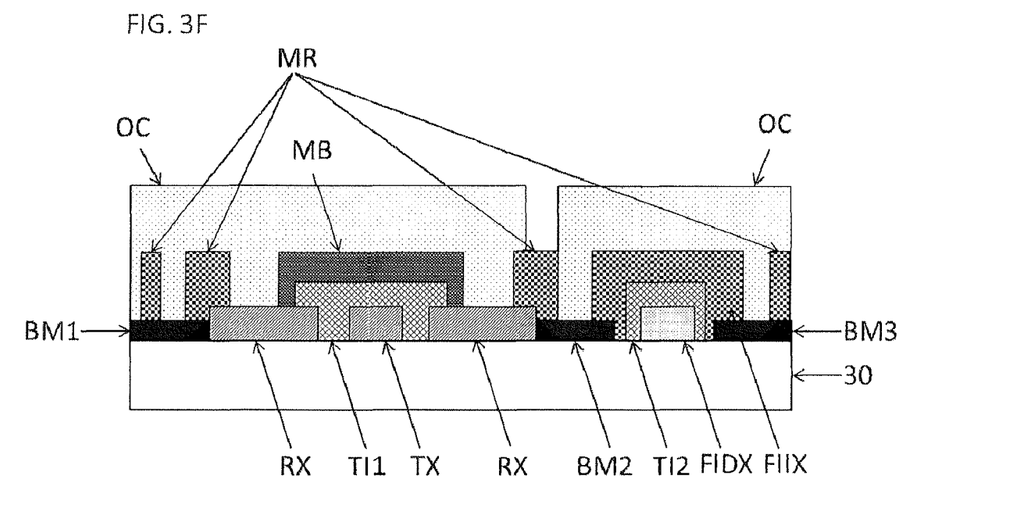

As shown in FIG. 3F, a cover layer is then formed, and a bonding area opening is formed.

A cover layer OC is provided on the display portion of the glass substrate 30 and a fingerprint recognition portion of the glass substrate 30, respectively. The cover layer OC does not cover at least a portion of the metal trace MR disposed between the display portion and the fingerprint recognition portion of the glass substrate, so as to form a bonding area opening. More particularly, at least a portion of the peripheral metal trace provided on the second black matrix BM2 is not covered by the cover layer OC.

The cover layer OC may be an insulating layer, in which case the cover layer OC is made of a transparent insulating material.

The cover layer OC protects the touch sensor provided on the display portion and the fingerprint sensor provided on the fingerprint recognition portion. The bonding area opening allows the metal trace MR in the bonding area opening to be electrically connected to an external circuit, for example, a control IC (integrated circuit), in order to receive and transmit signals.

Second Embodiment

Figure 4:
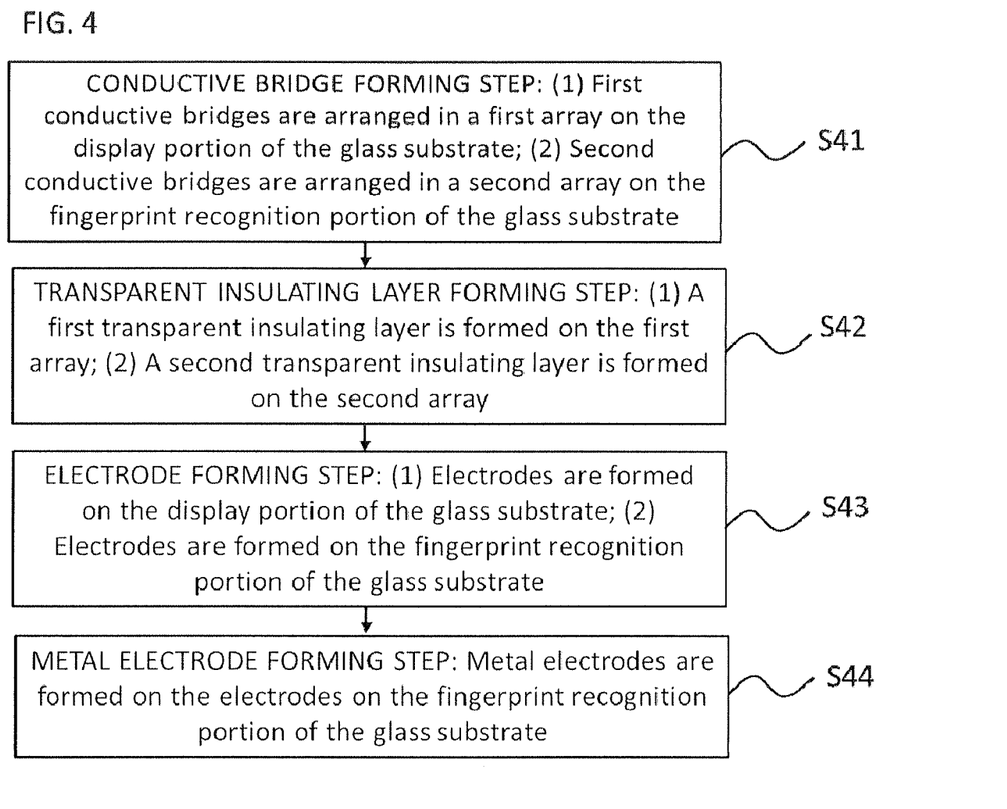
FIG. 4 is a flowchart of a method of manufacturing a sensor for a touch screen according to a second embodiment of the present disclosure.

According to a second embodiment of the present disclosure, as shown in FIG. 4, the sensor fabrication step S1 comprises the following steps.

A conductive bridge forming step S41: In a first patterning process, a conductive bridge layer is formed. A plurality of first conductive bridges are arranged in a first array on the display portion of the glass substrate. A plurality of second conductive bridges are arranged in a second array on the fingerprint recognition portion of the glass substrate. The first conductive bridges and the second conductive bridges may be made of a transparent conductive material in the first patterning process.

An insulating layer forming step S42: In a second patterning process, insulation layers are formed on the conductive bridge layer. A first transparent insulating layer is disposed on the first array, and a second transparent insulating layer is disposed on the second array. The first transparent insulating layer covers only a portion of the first array, and does not cover an entirety of the first conductive bridges. The second transparent insulating layer covers only a portion of the second array, and does not cover an entirety of the second conductive bridges. The first transparent insulating layer and the second transparent insulating layer may be made of a transparent insulating material in the second patterning process.

An electrode forming step S43: In a third patterning process, a patterned electrode layer is formed. A plurality of touch sensing electrodes are arranged in a first direction and a plurality of touch control electrodes are arranged in a second direction on the display portion of the glass substrate. A plurality of fingerprint sensing electrodes are arranged in the first direction and a plurality of fingerprint recognition control electrodes are arranged in the second direction on the fingerprint recognition portion of the glass substrate.

In the present disclosure, the first direction may refer to the longitudinal direction and the second direction to the transverse direction, or vice versa.

Either the touch control electrodes or the touch sensing electrodes are disposed on the first transparent insulating layer. The touch control electrodes intersect the touch sensing electrodes. At a position of intersection, either the touch control electrodes or the touch sensing electrodes are discontinuous. Two ends of a discontinuous electrode are connected to each other at the position of discontinuity via the first array of first conductive bridges.

Either the fingerprint recognition control electrodes or fingerprint sensing electrodes are disposed on the second transparent insulating layer. The fingerprint recognition control electrodes intersect the fingerprint sensing electrodes. At a position of intersection, either the fingerprint recognition control electrodes or the fingerprint sensing electrodes are discontinuous. Two ends of a discontinuous electrode at the position of discontinuity are connected to each other via the second conductive bridges.

The touch sensing electrodes, the touch control electrodes, the fingerprint sensing electrodes, and the fingerprint recognition control electrodes may be made of a transparent conductive material.

Metal electrode forming step S44: In a fourth patterning process, a patterned metal layer is formed. A metal control electrode is formed on the fingerprint recognition control electrode on the fingerprint recognition portion of the glass substrate, and a metal sensing electrode is formed on the fingerprint sensing electrode on the fingerprint recognition portion of the glass substrate. The metal electrodes may be formed directly on the electrodes. The pattern of the metal control electrode corresponds to the pattern of the fingerprint recognition control electrode, and preferably, the patterns are identical. The pattern of the metal sensing electrode corresponds to the pattern of the fingerprint sensing electrode, and here also, the patterns are preferably identical.

The method of manufacturing the touch screen according to the second embodiment of the present disclosure, as shown in FIG. 4, is described in more detail below.

First, in the first patterning process, a first array of first conductive bridges are arranged on the display portion, and a second array of second conductive bridges are arranged on the fingerprint recognition portion. The first conductive bridges and the second conductive bridges are made of transparent conductive material, so that the first conductive bridges provided on the display portion of the touch screen do not affect the display functions of the display portion.

In the second patterning process, a first transparent insulating layer is provided on the first array of conductive bridges, and a second transparent insulating layer is provided on the second array conductive bridges.

In the third patterning process, a plurality of touch sensing electrodes arranged in the first direction and a plurality of touch control electrodes arranged in the second direction are formed on the display portion of the glass substrate. Either the touch control electrodes or the touch sensing electrodes are disposed on the first transparent insulating layer. The touch sensing electrodes and the touch control electrodes intersect each other. At positions of intersection, either the touch control electrodes or the touch sensing electrodes are discontinuous. The two ends of a discontinuous electrode at the position of discontinuity are connected to each other via the first array of first conductive bridges.

Preferably, the touch sensing electrodes and the touch control electrodes are made of a transparent conductive material, so as to not affect the display functions of the display portion.

Further, in the third patterning process, the fingerprint sensing electrodes arranged along a first direction and the fingerprint recognition control electrodes arranged along a second direction are formed on the fingerprint recognition portion of the glass substrate.

Either the fingerprint recognition control electrodes or the fingerprint sensing electrodes are arranged on the second transparent insulating layer. The fingerprint recognition control electrodes intersect the fingerprint sensing electrodes. At the position of intersection, either the fingerprint recognition control electrodes or the fingerprint sensing electrodes are discontinuous. The two ends of a discontinuous electrode at the position of discontinuity are connected to each other via the second conductive bridges.

The fingerprint sensing electrodes and the fingerprint recognition control electrodes may be made of a transparent conductive material.

In the fourth patterning process, a metal control electrode is provided on the fingerprint recognition control electrode, and a metal sensing electrode is provided on the fingerprint sensing electrode. The pattern of the metal control electrode preferably corresponds to the pattern of the fingerprint recognition control electrode, and more preferably, the patterns are identical. The pattern of the metal sensing electrode preferably corresponds to the pattern of the fingerprint sensing electrode, and more preferably, the patterns are identical. The arrangement of the metal control electrode and the metal sensing electrode is designed to avoid interference with the control and sensing functions of the fingerprint recognition portion, while at the same time reduce impedance to the fingerprint recognition portion.

The metal electrode forming step S44 may further comprise providing, in the fourth patterning process, a peripheral metal trace along a periphery of each of the display portion and the fingerprint recognition portion of the glass substrate. Preferably, the peripheral metal trace is formed on the black matrix.

In the method for manufacturing a touch screen according to the second embodiment of the present disclosure, as shown in FIG. 4, the touch control electrodes, the touch sensing electrodes, the fingerprint recognition control electrodes, and the fingerprint sensing electrodes can be formed concurrently, for example, in parallel and/or simultaneously, in the third patterning process. This greatly simplifies the manufacturing process and reduces the manufacturing costs.

Then, in a fourth patterning process, a peripheral metal trace is formed on the black matrix, concurrently as the metal control electrode and the metal sensing electrode formed on the fingerprint recognition portion. The pattern of the metal control electrode corresponds to the pattern of the fingerprint recognition control electrode, and the pattern of the metal sensing electrode corresponds to the pattern of the fingerprint recognition sensing electrode. The present disclosure thus makes it possible to reduce impedance in the fingerprint recognition portion, without affecting the control and sensing functions of the fingerprint recognition portion.

Generally, after forming the touch sensor on the display portion, the LCM (liquid crystal display module) is then formed. This requires that the pattern be visible, so that in the display portion, ITO or other transparent conductive materials must be used, and conductive bridges should be made as small as possible to avoid interference with the display functions of the display portion. However, transparent conductive material tends to exhibit greater impedance, so that the sensitivity of the touch sensors in the display portion may be reduced. Meanwhile, display qualities are not a concern with the fingerprint recognition portion, so that metals can be used to form the fingerprint recognition control or sensing electrodes. Since metals tend to have a much lower resistance than transparent conductive materials, the use of metals satisfy the requirements of the touch sensing functions of the fingerprint recognition portion.

Prior to the conductive bridge forming step S41, there may be a partitioning step. A black matrix is patterned sequentially in a first direction onto the glass substrate, the black matrix including at least a first black matrix, a second black matrix, and a third black matrix. An area of the glass substrate between the first black matrix and the second black matrix is the display portion. An area of the glass substrate between the second black matrix and the third black matrix is the fingerprint recognition portion.

The first black matrix, the second black matrix and the third black matrix effectively function as borders for distinguishing between the display portion and the fingerprint recognition portion.

After the metal electrode forming step S44, there may be a step of forming a cover layer.

A cover layer may be provided on each of the display portion and the fingerprint recognition portion of the glass substrate. The cover layer does not cover at least a portion of the metal trace disposed between the display portion and the fingerprint recognition portion of the glass substrate, so as to form a bonding area opening for electrically connecting the portion of the metal trace to an external circuit. More particularly, the cover layer does not cover at least a portion of the peripheral metal trace provided on the second black matrix. The cover layer may be made of a transparent insulating material.

The cover layer protects the touch sensor provided on the display portion of the glass substrate, and the fingerprint sensor provided on the fingerprint recognition portion of the glass substrate. The bonding area opening allows the metal trace in the bonding area opening to be electrically connected to an external circuit, such as a control IC (integrated circuit), in order to receive and transmit signals.

Next, the method of manufacturing the touch panel according to the second embodiment will be described with reference to FIGS. 5A to 5G.

The second embodiment of the method for manufacturing the touch screen according to the present disclosure employs a 6-mask process.

Figure 5A:
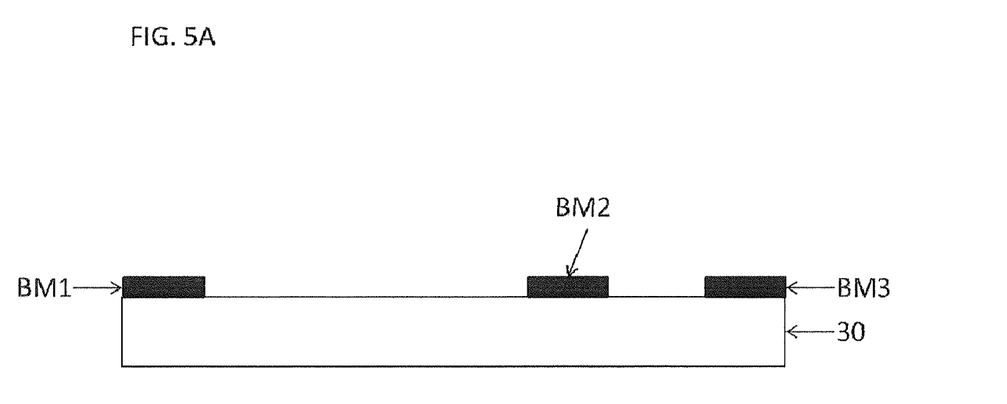
FIGS. 5A, 5B, 5D, 5E, 5F, and 5G show sectional schematic views of a touch screen formed according to the second embodiment of the present disclosure.

As shown in FIG. 5A, a black matrix layer is formed on the surface of the glass substrate 30 to partition the glass substrate into a display portion and a fingerprint recognition portion. The black matrix layer includes a first black matrix BM1, a second black matrix BM2, and a third black matrix BM3. An area of the glass substrate between the first black matrix BM1 and the second black matrix BM2 is the display portion. An area of the glass substrate between the second black matrix BM2 and the third black matrix BM3 is the fingerprint recognition portion.

Figure 5B:
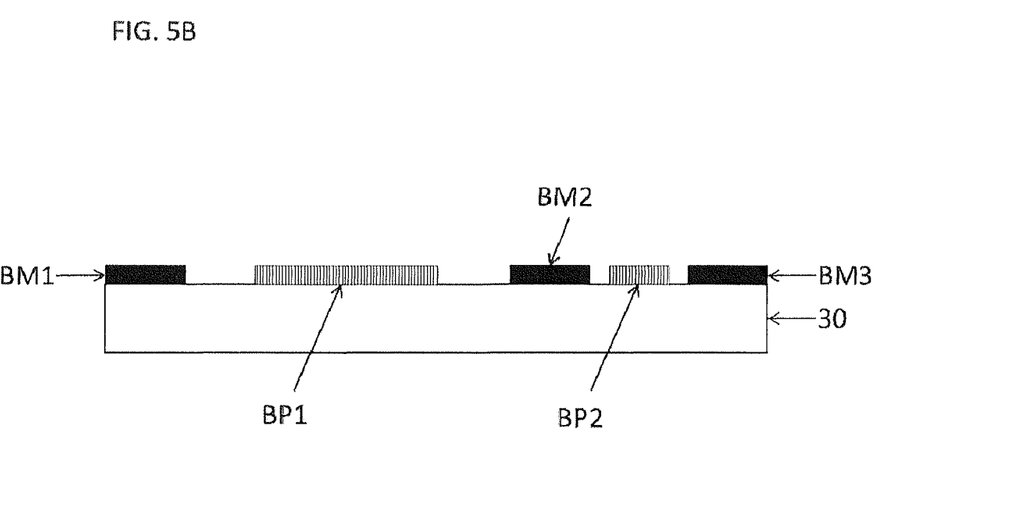

As shown in FIG. 5B, in the first patterning process, a first array of first conductive bridges BP1 is arranged on the display portion, and a second array of second conductive bridges BP2 is arranged on the fingerprint recognition portion. Both the first conductive bridges BP1 and the second conductive bridges BP2 may be made of a transparent conductive material, so that the first conductive bridges BP1 do not interfere with the display functions of the display portion. Specifically, the transparent conductive material may be ITO.

Figure 5C:
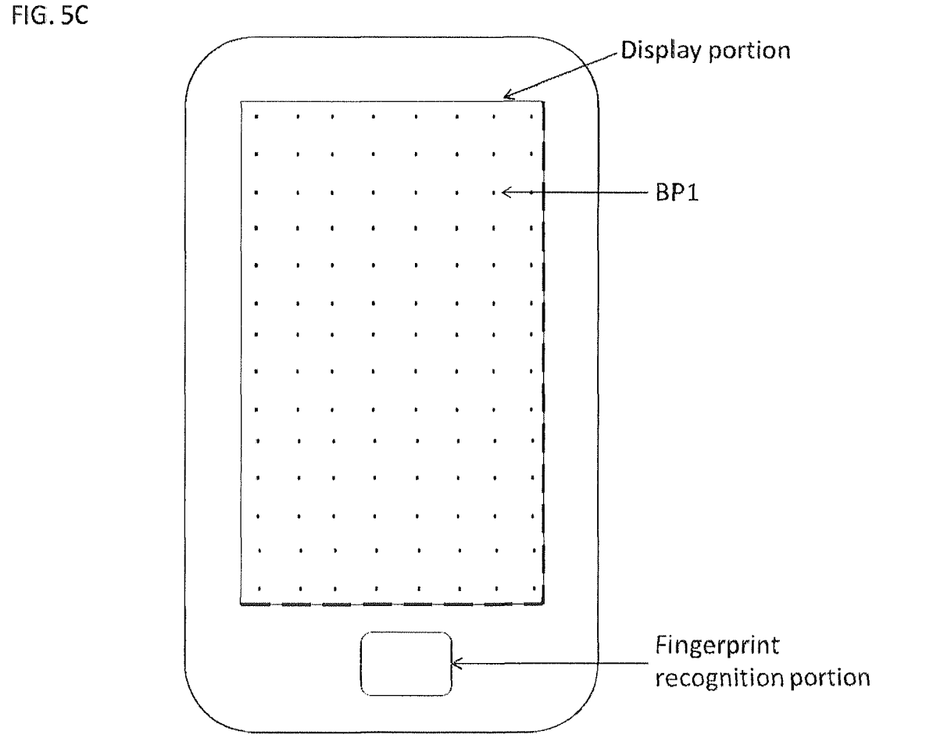
FIG. 5C is a top view of FIG. 5B.

FIG. 5C is a top view of FIG. 5B. In FIG. 5C, the second conductive bridges BP2 provided on the fingerprint recognition portion are not shown. The area of the fingerprint recognition portion is small and the second conductive bridges are more numerous, so that the second conductive bridges cannot be practically shown in the top view.

Figure 5D:
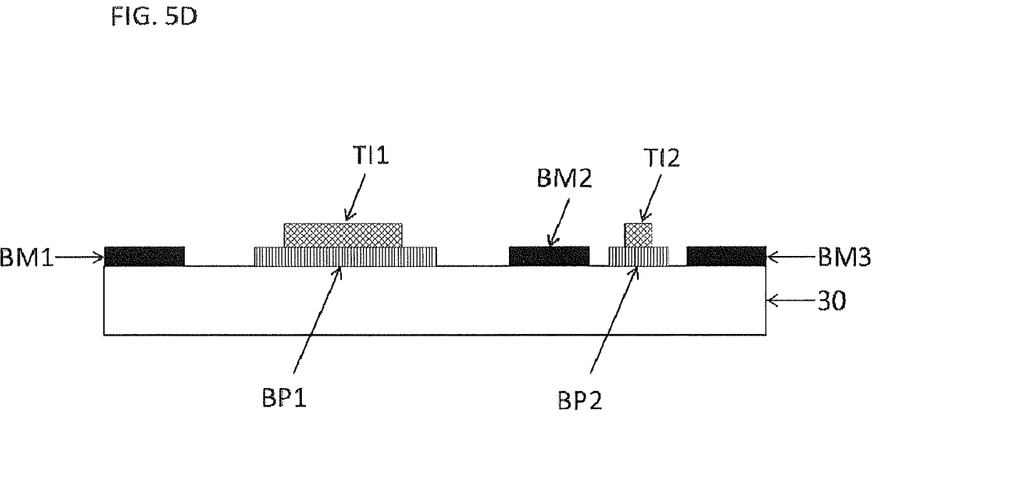

As shown in FIG. 5D, in the second patterning process, a first transparent insulating layer TI1 is provided on the first conductive bridges BP1, and a second transparent insulating layer TI2 is provided on the second conductive bridges BP2.

The first transparent insulating layer TI1 does not cover the entire first array of first conductive bridges BP1, and the second transparent insulating layer TI2 does not cover the entire second array of second conductive bridges BP2. The first transparent insulating layer TI1 and the second transparent insulating layers TI2 are made of a transparent insulating material.

The first transparent insulating layer TI1 can function to partition the subsequently formed touch control electrodes and the touching sensing electrodes, and the second transparent insulating layer TI2 can function to control the insulation between the subsequently formed fingerprint recognition control electrodes and the fingerprint sensing electrodes.

Figure 5E:
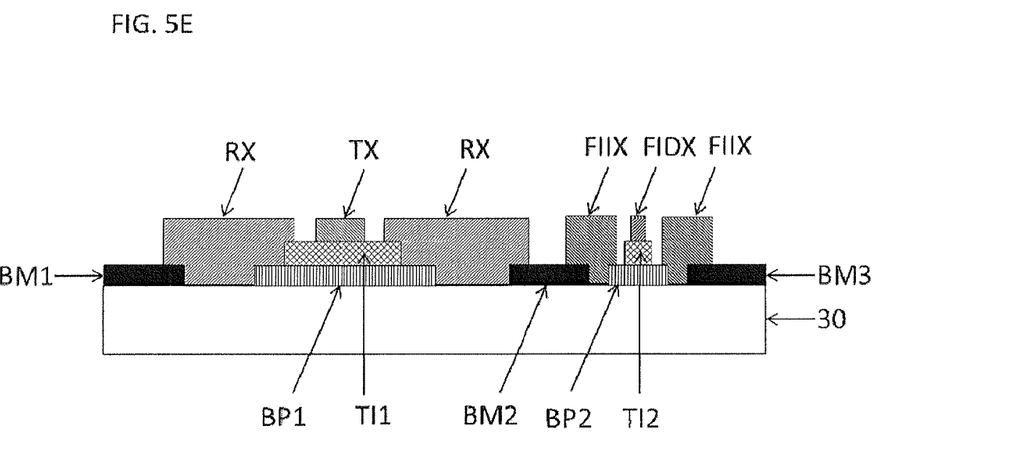

As shown in FIG. 5E, a third patterning process forms an ITO pattern on the display portion of the glass substrate, concurrently with an ITO pattern on the fingerprint recognition portion.

In the embodiment of the third patterning process illustrated in FIG. 5E, a plurality of touch sensing electrodes RX arranged in the longitudinal direction and a plurality of touch touch electrodes TX arranged in the transverse direction are formed on the display portion of the glass substrate 30. Further, a plurality of fingerprint sensing electrodes FIIX are formed in the longitudinal direction, and a plurality of fingerprint recognition control electrodes FIDX are formed in the transverse direction on the fingerprint recognition portion of the glass substrate 30. However, there are no particular limitations on the relative orientations of the electrodes.

In the embodiment illustrated in FIG. 5E, the touch control electrodes TX are provided on the first transparent insulating layer TI1. However, an embodiment where the touch sensing electrodes RX, instead of the touch control electrodes TX, are provided on the first transparent insulating layer TI1 is also possible.

The plurality of touch control electrodes TX and the plurality of touch sensing electrodes RX intersect each other. In the embodiment illustrated in FIG. 5E, at a position of intersection between the touch control electrodes TX and the touch sensing electrodes RX, the touch sensing electrodes RX are discontinuous, and the two ends of a touch sensing electrode RX at the position of discontinuity are connected to each other via the first conductive bridges BP1. However, an embodiment where the touch control electrodes TX are made discontinuous at the positions of intersection is also possible, and in such an embodiment, the first conductive bridges BP1 would connect the touch control electrodes TX.

In the embodiment illustrated in FIG. 5E, the fingerprint recognition control electrodes FIDX are provided on the second transparent insulating layer TI2. However, an embodiment where the fingerprint sensing electrodes FIIX are provided on the second transparent insulating layer TI2 is also possible.

The plurality of fingerprint recognition control electrodes FIDX and the plurality of fingerprint sensing electrodes FIIX intersect each other. In the embodiment illustrated in FIG. 5E, at a position of intersection between the fingerprint recognition control electrodes FIDX and the fingerprint sensing electrodes FIIX, the fingerprint sensing electrodes FIIX are discontinuous, and the two ends of a fingerprint sensing electrode FIIX at the position of discontinuity are connected to each other via the second conductive bridges BP2. However, an embodiment where the fingerprint recognition control electrodes FIDX are made discontinuous at the positions of intersection are also possible, and in such an embodiment, the fingerprint recognition control electrodes FIDX would be connected to each other via the second conductive bridges BP2.

The touch sensing electrodes, the touch control electrodes, the fingerprint sensing electrodes, and the fingerprint recognition control electrodes may be made of a transparent conductive material.

In the present disclosure, the first and second conductive bridges BP1, BP2 are formed first, and connect the electrodes subsequently formed on the display portion and the fingerprint recognition portion, respectively, of the glass substrate. The present disclosure thus makes it possible to form concurrently the touch sensor electrodes RX, touch control electrodes TX, fingerprint sensing electrodes FIIX, and fingerprint recognition control electrode FIDX.

Figure 5F:
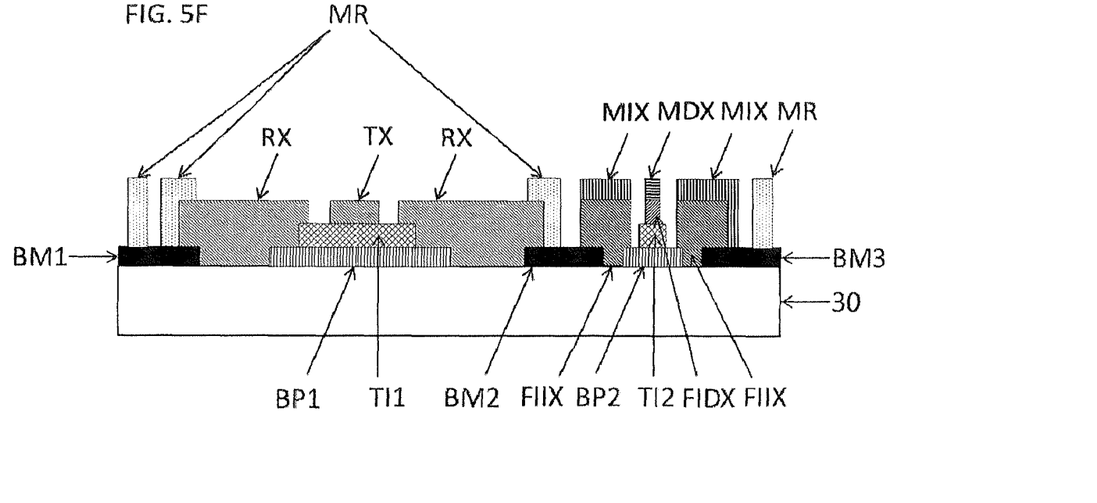

As shown in FIG. 5F, a fourth patterning process forms a metal trace on the black matrix layer, and a metal pattern on the fingerprint recognition portion of the glass substrate.

In the fourth patterning process, a metal control electrode MDX is disposed on the fingerprint recognition control electrode FIDX on the fingerprint recognition portion of the glass substrate 30, and a metal sensing electrode MIX is disposed on the fingerprint sensing electrode FIIX on the fingerprint recognition portion of the glass substrate 30. Further, a peripheral metal trace MR is provided on the black matrix BM1, BM2, BM3. The pattern of the metal control electrode MDX corresponds to the pattern of the fingerprint recognition control electrode FIDX, and the pattern of the metal sensing electrode MIX corresponds to the pattern of the fingerprint sensing electrode FIIX. Preferably, the patterns of the metal control electrodes MDX and the metal sensing electrodes MIX are identical to the patterns of the fingerprint recognition control electrode FIDX and the fingerprint sensing electrode FIIX, respectively.

Further, the peripheral metal trace MR provided on the first black matrix BM1 and the second black matrix BM2 forms the peripheral metal trace of the display portion, and the peripheral metal trace provided on the third black matrix BM3 forms the peripheral metal trace of the fingerprint recognition portion.

Figure 5G:
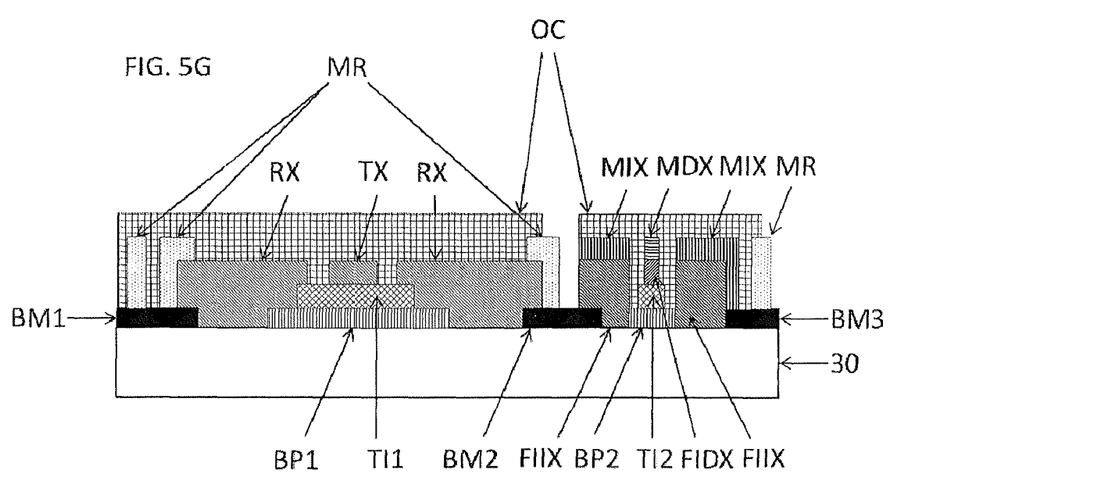

As shown in FIG. 5G, a cover layer OC is provided on the display portion of the glass substrate 30 and a fingerprint recognition portion of the glass substrate 30, respectively. The cover layer OC does not cover at least a portion of the peripheral metal trace MR disposed between the display portion and the fingerprint recognition portion, so as to form a bonding area opening. More particularly, at least a portion of the peripheral metal trace MR provided on the second black matrix BM2 is not covered by the cover layer OC.

The cover layer OC is made of a transparent insulating material.

The cover layer OC protects the touch sensor provided on the display portion and the fingerprint sensor provided on the fingerprint recognition portion. The bonding area opening allows the metal trace MR in the bonding area opening to be electrically connected to a control IC (integrated circuit), in order to receive and transmit signals.

Next, the touch display panel according to the present disclosure will be described. In one embodiment, the touch display panel comprises a glass substrate, a touch sensor, and a fingerprint sensor, the touch sensor and the fingerprint sensor having been concurrently formed on the glass substrate.

The thickness of a portion of the glass substrate facing the fingerprint sensor is smaller than a thickness of a portion of the glass substrate facing the touch sensor. Preferably, the thickness of the portion of the glass substrate facing the fingerprint sensor is less than or equal to 0.1 mm.

In a first embodiment, the touch sensor includes:

a plurality of touch sensing electrodes arranged in a first direction on a display portion of the glass substrate;

a plurality of touch control electrodes arranged in a second direction on the display portion of the glass substrate, the plurality of touch control electrodes intersecting the plurality of touch sensing electrodes, and at a position of intersection, either the touch control electrodes or the touch sensing electrodes are discontinuous;

a first transparent insulating layer on the touch control electrodes and the touch sensing electrodes, which insulates the touch control electrodes from the touch sensing electrodes; and, a bridge line disposed on the display portion of the glass substrate, which connects the two ends of a discontinuous electrode at the position of discontinuity.

The touch control electrodes and the touch sensing electrodes may be made of a transparent conductive material. The bridge line may be made of a conductive metal.

The fingerprint sensor includes at least the following:

a plurality of first electrodes arranged in the second direction on a fingerprint recognition portion of the glass substrate;

a second transparent insulating layer on the first electrodes; and, a plurality of second electrodes arranged in the first direction on the fingerprint recognition portion of the glass substrate.

The first electrodes may be made of a transparent conductive material. The second electrodes may be made of a conductive metal.

The first electrodes and the second electrodes may be fingerprint recognition control electrodes and the fingerprint sensing electrodes, or vice versa. There are no particular limitations on the order in which the fingerprint recognition control electrodes and the fingerprint sensing electrodes are formed.

In a second embodiment, the touch sensor includes:

a first array of first conductive bridges provided on a display portion of the glass substrate, the first conductive bridges being made of a transparent conductive material;

a first transparent insulating layer disposed on the first conductive bridges, the first transparent insulating layer not covering an entirety of the first conductive bridges, the first transparent insulating layer being made of a transparent insulating material; and, a plurality of touch sensing electrodes arranged in a first direction and a plurality of touch control electrodes arranged in a second direction on the display portion of the glass substrate. Either the touch control electrodes or the touch sensing electrodes are disposed on the first transparent insulating layer.

The touch control electrodes intersect the touch sensing electrodes. At a position of intersection, either the touch control electrodes or the touch sensing electrodes are discontinuous, and the two ends of a discontinuous electrode at the position of discontinuity are connected to each other via the first conductive bridges. The touch sensing electrodes and the touch control electrodes are made of a transparent conductive material.

The fingerprint sensor includes:

a first array of second conductive bridges provided on a fingerprint recognition portion of the glass substrate, the second conductive bridges being made of a transparent conductive material;

a second transparent insulating layer disposed on the second conductive bridges, the second transparent insulating layer being made of a transparent insulating material; and a plurality of fingerprint sensing electrodes arranged in a first direction and a plurality of fingerprint recognition control electrodes arranged in a second direction on the fingerprint recognition portion of the glass substrate. Either the plurality of fingerprint recognition control electrodes or the fingerprint sensing electrodes are disposed on the second transparent insulating layer.

The fingerprint recognition control electrodes intersect the fingerprint sensing electrodes. At a position of intersection, either the fingerprint recognition control electrodes or the fingerprint sensing electrodes are discontinuous, and the two ends of a discontinuous electrode at the position of discontinuity are connected to each other via the second conductive bridges. The fingerprint sensing electrodes and the fingerprint recognition control electrodes are made of a transparent conductive material.

The fingerprint sensor further includes a metal control electrode disposed on the fingerprint recognition control electrode o, and a metal sensing electrode disposed on the fingerprint sensing electrode. The pattern of the metal control electrode corresponds to the pattern of the fingerprint recognition control electrode. Preferably, the pattern of the metal control electrode is identical to the pattern of the fingerprint recognition control electrode. The pattern of the metal sensing electrode corresponds to the pattern of the fingerprint sensing electrode. Preferably, the pattern of the metal sensing electrode is identical to the pattern of the fingerprint sensing electrode.

An embodiment of the present disclosure also provides a display device including the touch screen described above.

The present disclosure provides a method of making a touch screen with fingerprint recognition functionalities, which simplifies the manufacturing process and reduces the manufacturing costs. The present disclosure also provides a touch screen with fingerprint recognition functionalities, and a display device comprising the touch screen. The present disclosure improves on the existing methods of manufacturing a touch screen, and in particular a touch screen having fingerprint recognition functionalities. At least in some embodiments of the present invention, a touch sensor for a capacitive-type touch screen, including mutual-capacitance touch screens, is formed on a glass substrate concurrently as a fingerprint sensor for a capacitive-type fingerprint recognition module, including mutual-capacitance fingerprint recognition. The glass substrate is then thinned to reduce its thickness, which makes it possible to design a fingerprint recognition module in which changes in capacitance in the fingerprint recognition module can be amplified. The present disclosure thus makes it possible to design a fingerprint recognition module that can be integrated into a touch screen. By concurrently forming the touch sensor and the fingerprint sensor, for example, in parallel and/or simultaneously, the present disclosure also avoids the conventional, inefficient, and complicated process of forming an opening in the glass substrate in order to embed the fingerprint recognition module into the glass substrate. The present disclosure simplifies the process of manufacturing a touch screen with integrated fingerprint recognition technology, and reduce the manufacturing costs.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of manufacturing a touch screen, comprising:
   forming a black matrix pattern on a glass substrate, the black matrix pattern comprising a first black matrix, a second black matrix, and a third black matrix arranged consecutively, so that an area of the glass substrate between the first black matrix and the second black matrix defines a display portion of the touch screen, and an area of the glass substrate between the second black matrix and the third black matrix defines a fingerprint recognition portion of the touch screen,
   after forming the black matrix pattern, performing a first patterning step to form a patterned electrode layer on the glass substrate by using a first single mask, the patterned electrode layer comprising a plurality of first electrodes forming the touch sensor on a first portion of the glass substrate in the display portion, and a plurality of second electrodes forming a first component of the fingerprint sensor on a second portion of the glass substrate in the fingerprint recognition portion, wherein the plurality of second electrodes comprises a plurality, of fingerprint sensing electrodes,
   performing a second patterning step to form a first insulating layer on the patterned electrode layer by using a second single mask,
   performing a third patterning step to form a first patterned metal layer covering the insulating layer and the patterned electrode layer by using a third single mask, the first patterned metal layer comprising a plurality of metal electrodes forming a second component of the fingerprint sensor, wherein the plurality of metal electrodes comprises a plurality of fingerprint recognition control electrodes, and
   performing a fourth patterning step using a fourth single mask to form a second patterned metal layer, the second patterned metal layer comprising a plurality of metal control electrodes on the plurality of fingerprint recognition control electrodes, a plurality of metal sensing electrodes on the plurality of fingerprint sensing electrodes, and a metal trace on the first black matrix, the second black matrix, and the third black matrix,
   wherein in the fourth patterning step, a pattern of the plurality of metal control electrodes corresponds to a pattern of the plurality of fingerprint recognition control electrodes, a pattern of the plurality of metal sensing electrodes corresponds to a pattern of the plurality of the fingerprint sensing electrodes, a first portion of the metal trace on the first black matrix and the second black matrix extends along at least a portion of a periphery of the display portion, and a second portion of the metal trace on the third black matrix extends along at least a portion of a periphery of the fingerprint recognition portion,
   wherein the patterned electrode layer, the insulating layer and the patterned metal layer form a touch sensor and a fingerprint sensor, and
   wherein the method further comprises, after the fourth patterning step, providing a protective layer on the fingerprint sensor, reducing a thickness of a portion of the glass substrate facing the fingerprint sensor to less than or equal to 0.1 mm, and removing the protective layer.

2. The method according to claim 1,
   wherein the plurality of first electrodes comprise a plurality of touch sensing electrodes arranged in a first direction, and a plurality of touch control electrodes arranged in a second direction, and
   wherein the plurality of touch sensing electrodes intersect the plurality of touch control electrodes, and one of the plurality of touch sensing electrodes and the plurality of touch control electrodes are discontinuous at positions of intersection.

3. The method according to claim 1,
   wherein the first patterned metal layer further comprises a plurality of metal bridges for connecting the first electrodes.

4. The method according to claim 3,
   wherein each of the plurality of metal bridges is formed on the first electrodes, so as to connect two ends of discontinuous one of touch sensing electrode and touch control electrode at a position of intersection.

5. The method according to claim 1,
   wherein the plurality of first electrodes and the plurality of second electrodes are composed of a transparent conductive material.

6. The method according to claim 1, further comprising forming a cover layer, wherein the cover layer does not cover at least a portion of the metal trace, so as to form a bonding area opening for electrically connecting the portion of the metal trace to an external circuit.

7. The method according to claim 1,
   wherein before forming the patterned electrode layer on the glass substrate, the method further comprises:
   forming a conductive bridge layer on the glass substrate, the conductive bridge layer comprising a first array of first conductive bridges arranged on a portion of the glass substrate in the display portion, and a second array of second conductive bridges on a portion of the glass substrate in the fingerprint recognition portion, and
   forming a second insulation layer on the conductive bridge layer.

8. The method according to claim 7,
   wherein the first electrodes comprise a plurality of touch sensing electrodes arranged in a first direction, and a plurality of touch control electrodes arranged in a second direction, and
   wherein the plurality of touch sensing electrodes intersect the plurality of touch control electrodes, and one of the plurality of touch sensing electrodes and the plurality of touch control electrodes are discontinuous at positions of intersection, each of the first conductive bridges connecting two ends of discontinuous one of touch sensing electrode and touch control electrode at a position of intersection.

9. The method according to claim 7, wherein the plurality of fingerprint sensing electrodes are arranged in a first direction, and the plurality of fingerprint recognition control electrodes are arranged in a second direction, and wherein the plurality of fingerprint sensing electrodes intersect the plurality of fingerprint recognition control electrodes, and one of the plurality of fingerprint sensing electrodes and the plurality of fingerprint recognition control electrodes are discontinuous at positions of intersection, each of the second conductive bridges connecting two ends of discontinuous one of touch sensing electrode and touch control electrode at a position of intersection.

10. The method according to claim 7, further comprising forming a cover layer, wherein the cover layer does not cover at least a portion of the metal trace, so as to form a bonding area opening for electrically connecting the portion of the metal trace to an external circuit.

11. A touch screen, comprising:

a glass substrate, a black matrix layer on the glass substrate, the black matrix layer comprising a first black matrix, a second black matrix, and a third black matrix arranged consecutively, so that an area of the glass substrate between the first black matrix and the second black matrix defines a display portion of the touch screen, and an area of the glass substrate between the second black matrix and the third black matrix defines a fingerprint recognition portion of the touch screen, a touch sensor disposed on a first portion of the glass substrate in the display portion, and a fingerprint sensor disposed on a second portion of the glass substrate in the fingerprint recognition portion, wherein a thickness of the second portion of the glass substrate facing the fingerprint sensor is smaller than a thickness of the first portion of the glass substrate facing the touch sensor, wherein the touch sensor comprises a plurality of touch sensing electrodes and a plurality of touch control electrodes, wherein the fingerprint sensor comprises a plurality of fingerprint sensing electrodes, a plurality of fingerprint recognition control electrodes, a plurality of metal sensing electrodes on the plurality of fingerprint sensing electrodes, and a plurality of metal control electrodes on the plurality of fingerprint recognition control electrodes, wherein the touch screen further comprises a metal trace on the first black matrix, the second black matrix, and the third black matrix, a first portion of the metal trace on the first black matrix and the second black matrix extending along at least a portion of a periphery of the display portion, and a second portion of the metal trace on the third black matrix extending along at least a portion of a periphery of the fingerprint recognition portion, wherein the plurality of touch sensing electrodes, the plurality of touch control electrodes, and the plurality of fingerprint sensing electrodes are composed of a transparent conductive material, and wherein the plurality of fingerprint recognition control electrodes are composed of a metal material.

12. A display device, comprising the touch screen according to claim 11.

* * * * *